United States Patent [19]

Whims et al.

[11] Patent Number: 5,155,326
[45] Date of Patent: Oct. 13, 1992

[54] POROUS MATERIALS BRAZING

[75] Inventors: Lawrence J. Whims, Greer, S.C.; Daniel A. Bales, Palm City, Fla.

[73] Assignee: United Technologies Corporation, Hartford, Conn.

[21] Appl. No.: 633,700

[22] Filed: Dec. 24, 1990

[51] Int. Cl.$^5$ .............................. B23K 26/00
[52] U.S. Cl. ..................... 219/121.64; 219/121.14; 219/85.22
[58] Field of Search .............. 219/85.1, 85.22, 121.64, 219/121.14

[56] References Cited

U.S. PATENT DOCUMENTS

| | | | |
|---|---|---|---|
| 3,150,446 | 9/1964 | Todd | 29/475 |
| 3,222,774 | 12/1965 | Kump et al. | 29/488 |
| 3,224,071 | 12/1965 | Levi et al. | 29/155.5 |
| 3,636,250 | 1/1972 | Haeff | 250/199 X |
| 4,195,764 | 4/1980 | Bogart | 228/208 |
| 4,471,202 | 9/1984 | Riordan et al | 219/85.1 |
| 4,492,843 | 1/1985 | Miller et al. | 219/121.63 |
| 4,763,399 | 8/1988 | Roe | 29/527.2 |

Primary Examiner—C. L. Albritton

[57] ABSTRACT

A method is provided for brazing of porous metallic materials while avoiding wicking of braze material away from the braze joint. The porous material is locally melted and solidified to provide solid material in the region of the braze joint. The braze joint is machined in this solidified material. Brazing is then performed on nonporous surfaces of the porous materials. This method provides effective braze joints in porous material while avoiding the introduction of any foreign matter into the structure.

5 Claims, 3 Drawing Sheets

POROUS MATERIALS BRAZING

DESCRIPTION

1. Technical Field

This invention relates to the brazing of porous metallic materials and more particularly to brazing without wicking of the braze material away from the braze joint into the porous material.

2. Background Art

The combustion processes of rocket and hypersonic engines require operating conditions which expose some of the combustion section components of the engines to very high temperatures. These temperatures can far exceed the base capabilities of the materials used. Without some rather creative cooling concepts, these components would fail very quickly.

For example, the fuel injectors for rocket or hypersonic engines are mounted in porous plates which permit a portion of the fuel or oxidizer to pass through to the combustion side of the plates and provide a means for uniform removal of heat across the entire surface of the plates. This method of heat removal, known as transpiration cooling, prevents the plates from overheating as long as sufficient coolant flows through the plates.

The fabrication of these injector plates often requires the brazing of tubes or injectors into holes through the plates. An inherent difficulty in brazing these materials is that the braze material tends to flow by capillary action into the porous material. The capillary flow of the braze material into the porous material, referred to hereinafter as wicking, starves the braze joints of braze material, producing ineffectual braze joints. Perhaps a more serious problem is that the portion of the porous plate where the wicking occurs becomes nonporous and is incapable of flowing coolant through to the hot combustion chamber surface. Thus, no cooling can occur in these nonporous areas, and potentially damaging hot spots develop.

U.S. Pat. No. 3,150,446 describes a brazing method in which the braze material is selected so that when the porous object being brazed alloys with the melted braze material, the melting point of the braze material increases. This results in solidification of the braze material when its melting point rises above the braze temperature. Thus wicking or flow of the braze material into the porous material ceases.

U.S. Pat. No. 3,222,774 describes a process with a similar result in which the braze material alloys with an intermediate metal foil changing the composition of the braze material such that its melting point gradually increases during flow into the porous structure. Again, when the melting point of the braze material exceeds the braze temperature, solidification occurs, and wicking of the braze material into the porous material ceases.

U.S. Pat. No. 3,224,071 describes a process in which the pores of the porous metal material are filled with a material which is inert to the brazing material during the brazing step, providing a barrier against the wicking of the braze material into the porous structure. The inert material is removed after the brazing process to restore the porosity of the structure.

U.S. Pat. No. 4,195,764 describes a process in which the joint surface of a porous powder metal piece is plated with a thin layer of metal having a relatively high melting point. When the brazing operation is performed with a brazing alloy having a melting point significantly less than that of the plated layer, the plated layer provides a solid barrier which prevents the braze material from penetrating into the porous structure.

While each of the aforementioned methods can be effectively used for brazing porous materials, each adds either additional processing steps or introduces additional materials into the brazed structure. It is therefore desirable to produce reliable braze joints simply and economically in porous materials without the introduction of additional materials into the structure.

DISCLOSURE OF INVENTION

The subject method of brazing of porous materials includes the melting and solidification of the porous material in the region where the braze joint surface will be prepared, and can be used for brazing a solid member to a porous member, or brazing two or more porous members together. Melting is performed, for example, by flame heating, radiant heating, electrical induction heating, laser welding or electron beam welding. The braze joint surface is prepared by machining away metal in the solidified region, thus providing a nonporous layer for the braze operation and eliminating the problems associated with wicking of the braze material away from the braze joint into the porous material. In this manner a conventional brazing operation joining nonporous surfaces is readily performed.

The foregoing and other features and advantages of the present invention will become more apparent from the following description and accompanying drawings.

BEST MODE FOR CARRYING OUT THE INVENTION

The invention process is best understood through consideration of FIGS. 1 through 4 which illustrate the brazing of a nonporous hollow tube into a hole through a flat plate of porous material.

Figure 1:
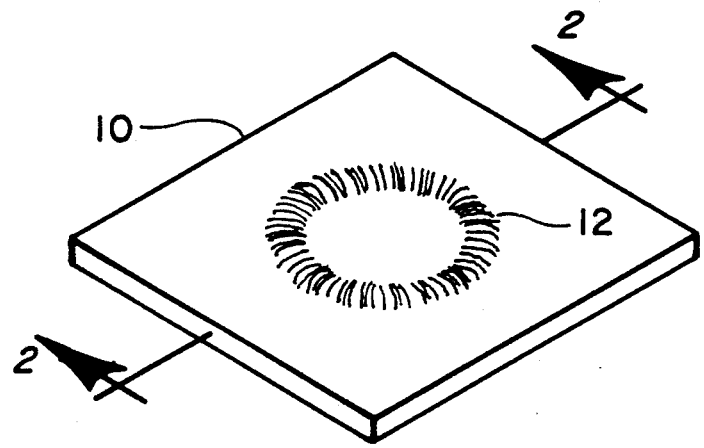
FIG. 1 shows a perspective view of a porous plate with a circular full penetration weld.

FIG. 1 shows a flat plate 10 of porous material, for example, Rigimesh ® manufactured by Pall Corporation of Glen Cove, N.Y., which is to be drilled to provide a hole to accept a hollow tube which will be brazed therein. The porous material is typically made of type 347 stainless steel, Haynes 230, or Haynes 188 alloys, and the tube is selected to be of the same or similar material as the plate. Electron beam welding is used to provide a circular full penetration bead-on-plate weld 12 centered on the hole to be drilled to accept the hollow tube.

Figure 2:
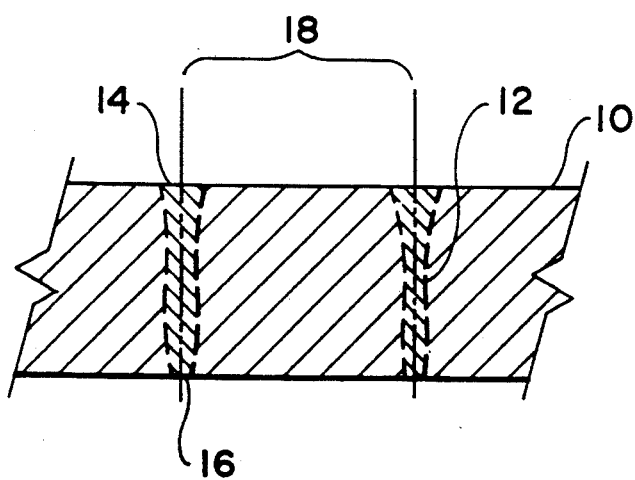
FIG. 2 is an axial cross section through the circular weld shown in FIG. 1.

As shown in FIG. 2, the weld 12 penetrates completely through the thickness of the porous plate 10 and melts and solidifies the originally porous material in the weld zone. Although the cross section of the weld 12 is tapered from entry 14 to exit 16, the width is sufficient such that when the hole, indicated by the broken lines 18, is drilled through the plate, the drilling to prepare the braze joint surface will occur within the nonporous weld zone 12 of the porous material. Even if the hole is slightly inside the weld zone, the solidified material would effectively block the flow of braze metal into the porous structure.

Figure 3:
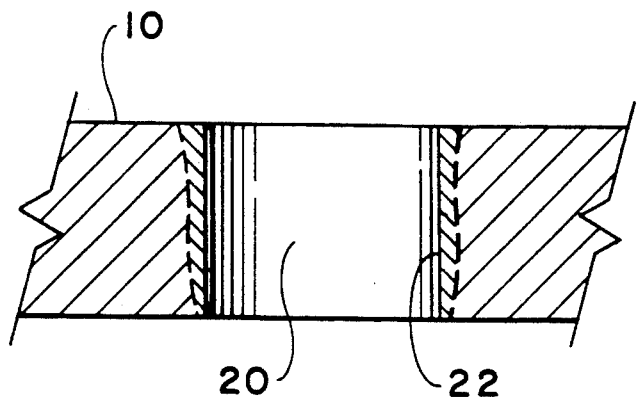
FIG. 3 is an axial cross section through the circular weld shown in FIG. 2 after the hole has been machined into the welded portion to accept a hollow tube.

FIG. 3 shows the plate 10 of FIG. 2 after a hole 20 of appropriate size for accepting the hollow tube has been drilled. The figure indicates that the surface 22 of the hole is in the solidified weld zone 12.

Figure 4:
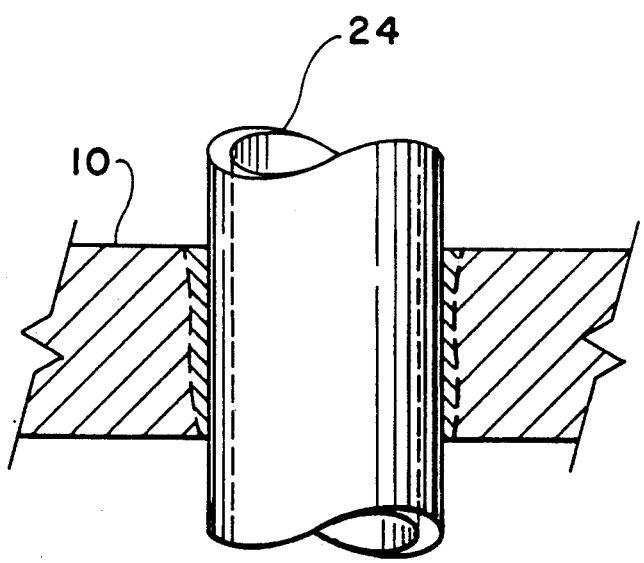
FIG. 4 is an axial cross section through the machined hole shown in FIG. 3 after a hollow tube has been brazed in place.

FIG. 4 shows the plate 10 of FIG. 3 after a hollow tube 24 has been inserted and brazed in place. It is apparent that because of the solidified material which forms the braze joint surface in the porous material, the brazing operation can be performed without the detrimental wicking of braze material away from the braze joint into the porous material.

It will be apparent to those skilled in the art that the preparation of braze joints in porous material is not restricted to the configuration shown. Equally possible are the joining of flat surfaces, irregular surfaces, etc. there may also be situations where the braze surface need not extend the entire length of a joint. In these situations only the portions of the joint surface where brazing is required need be made nonporous.

Figure 5:
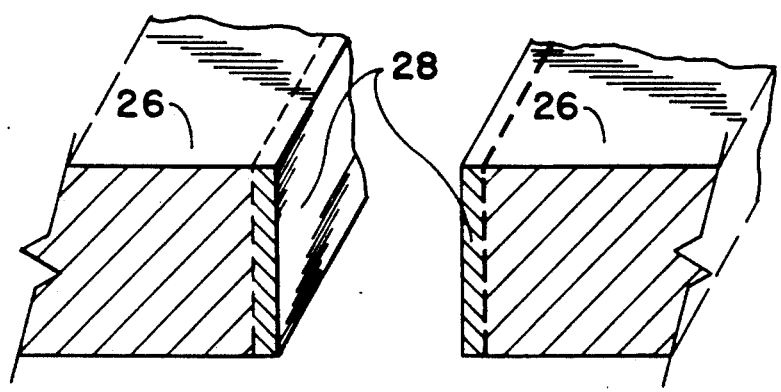
FIG. 5 is a cross section of two porous plates which have been prepared for brazing edge-to-edge.

In the case of components which are too thick for melting and solidification by complete penetration of a weld through a plate, those skilled in the art will understand that the porous member can be machined in the vicinity of the braze joint such that sufficient material remains to provide a nonporous region encompassing the location of the braze joint surface. This region of the porous material can then be melted by, for example, electron beam or laser welding, or open flame, electric arc, induction or radiant heating, and allowed to solidify. The braze joint surface can then be prepared as before to provide a surface which will not be subject to wicking of the braze material away from the braze joint during the brazing operation. FIG. 5 shows an example where two flat porous plates 26 have been prepared for edge-to-edge brazing. The edge 28 of each plate has been melted and solidified, and machined to form mating nonporous braze surfaces.

Although this invention has been shown and described with respect to detailed embodiments thereof, it will be understood by those skilled in the art that various changes in form and detail thereof may be made without departing from the spirit and scope of the claimed invention.

We claim:

1. A method for brazing a solid member to a porous member comprising:
   a. melting and solidifying a portion of said porous member to provide a nonporous layer in the region where brazing is to be performed;
   b. preparing a braze joint surface in said nonporous layer; and
   c. brazing said solid member to said prepared braze joint surface in said porous member.

2. A method as recited in claim 1 wherein said melting is performed by a method selected from the group consisting of electron beam welding, laser welding, open flame heating, electric arc heating, induction heating and radiant heating.

3. A method as recited in claim 1 wherein said solid member is cylindrical and said porous member is melted by electron beam welding through the full thickness of said porous member.

4. A method for brazing at least two porous members together comprising:
   a. melting and solidifying a portion of each of said porous members to provide a nonporous layer in the region where brazing is to be performed;
   b. preparing a braze joint surface in said nonporous layer of each of said porous members; and
   c. brazing said prepared braze joint surfaces in said porous members together.

5. A method as recited in claim 4 wherein said melting is performed by a method selected from the group consisting of electron beam welding, laser welding, open flame heating, electric arc heating, induction and radiant heating.

* * * * *